(12) United States Patent
Norton

(10) Patent No.: US 6,439,066 B1
(45) Date of Patent: Aug. 27, 2002

(54) TORQUE SENSOR

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

(21) Appl. No.: 09/186,773

(22) Filed: Nov. 5, 1998

Related U.S. Application Data

(63) Continuation-in-part of application No. 08/812,054, filed on Mar. 8, 1997, now abandoned, which is a continuation-in-part of application No. 08/696,503, filed on Aug. 14, 1996, now abandoned.

(51) Int. Cl.⁷ ................................................. G01L 3/02
(52) U.S. Cl. ................................................. 73/862.333
(58) Field of Search ....................... 73/862.333, 862.336

(56) References Cited

U.S. PATENT DOCUMENTS

| | | | | |
|---|---|---|---|---|
| 4,454,504 A | * | 6/1984 | Jocz ........................... 340/665 |
| 4,711,134 A | * | 12/1987 | Kita ........................ 73/862.36 |
| 4,780,671 A | * | 10/1988 | Hase et al. ................... 324/209 |
| 4,926,687 A | * | 5/1990 | Avny ........................... 73/161 |
| 5,351,555 A | * | 10/1994 | Garshelis ............... 73/862.335 |
| 5,353,649 A | * | 10/1994 | Hase et al. ............. 73/862.335 |
| 5,526,704 A | * | 6/1996 | Hoshina et al. ........ 73/862.335 |
| 5,708,216 A | * | 1/1998 | Garshelis ............... 73/862.335 |
| 5,880,379 A | * | 3/1999 | Tanaka et al. .......... 73/862.335 |
| 6,237,428 B1 | * | 5/2001 | Odachi et al. ......... 73/862.333 |

\* cited by examiner

*Primary Examiner*—Benjamin R. Fuller
*Assistant Examiner*—Jewel V. Thompson

(57) ABSTRACT

A sensor for sensing torque applied to a shaft such as the steering wheel shaft of a vehicle has a magnetostrictive sleeve and a sensing element responsive to torsional strain in the magnetostrictive sleeve. Each end of the magnetostrictive sleeve is torsionally engaged to a shear leveling member. Each shear leveling member has a region of varying torsional stiffness and a flared end. Each shear leveling member is bonded to the shaft by adhesive at its region of varying torsional stiffness and at its flared end. The regions of varying torsional stiffness and flared ends operate to level the shear stress in the adhesive resulting in uniform shear stress without peaks throughout the adhesive bond. With uniform adhesive shear stress, the maximum torque the adhesive can transmit is limited only by the yield torque of the shaft and the area of adhesive bond. The area of adhesive bond can be increased without limit by increasing the length of the shear leveling member thereby making the yield torque of the shaft the only limit to the torque transmitted. In one embodiment a stack of washers provides radial forces to stabilize the surface of the magnetostrictive sleeve without applying torque to the sleeve. The response of the sensor is made independent of angular position by providing a circularly symmetric sensing element located on the axis of rotation of the sleeve.

25 Claims, 2 Drawing Sheets

TORQUE SENSOR

This application is a continuation-in-part of application Ser. No. 08/812,054 filed Mar. 8, 1997, now abandoned and titled Torque Sensor which is a continuation-in-part of application Ser. No. 08/696,503 filed Aug. 14, 1996 now abandoned also titled Torque Sensor.

FIELD OF THE INVENTION

This invention relates to sensors that measure torque applied to a shaft. It particularly relates to sensors having a sleeve torsionally engaged with the shaft and sensing means responsive to torsional strain in the sleeve.

BACKGROUND OF THE INVENTION

Many known torque sensors operate by responding to magnetostrictive effects resulting from strain in a stressed member or transducer. Some of these are in commercial production. Efforts have been directed toward using magnetostrictive effects to measure the torque applied to the steering wheel by the driver of a motor vehicle. One known design torsionally engages a sleeve having desirable magnetostrictive properties to a portion of the steering wheel shaft. Another design uses the magnetostrictive properties of a current production steering wheel shaft to eliminate the cost of attaching a sleeve to the steering wheel shaft. In a third known design magnetostrictive material is beam or vapor deposited on a steering wheel shaft. The known designs have not proved entirely satisfactory. Known methods of attaching a sleeve require processes that are not easily adapted to large volume production. The same is true of beam or vapor deposition of magnetostrictive materials. Efforts to use the shaft itself have suffered from the difficulty of obtaining shafts consistently having desired magnetostrictive properties. For measuring steering torque in an automobile the ideal sensor would be inexpensive and compatible with existing steering wheel shafts.

The expression "torsionally engaged" is used herein to describe engagement between a first element and a second element for transmitting torque therebetween. It includes engagement for transmitting torque by a rigid attachment such as a weld or adhesive joint or both elements being made of one piece of material. It also includes engagement by means that transmit only torque exemplified by a wrench socket engaging the head of a bolt. The expression "torsionally engaged" is used to cover a broad range of torque transmitting engagement means that may or may not transmit forces in addition to torque.

A torque sensor incorporating a sleeve of magnetostrictive material is described in U.S. Pat. No. 5,351,555 issued Oct. 4, 1994 to Garshelis. Particular attention is focused on the Garshelis patent because it is believed to offer the lowest cost sensor responsive to torque applied to a magnetostrictive sleeve. However, the invention is applicable to any torque sensor having a sleevelike transducer that is torsionally stressed when torque is applied to a shaft.

The Garshelis design provides a sleeve ("transducer") permanently magnetized in its circumferential direction. Garshelis discusses attachment of the transducer to the torsionally stressed shaft and (column 15 beginning at line 7) describes requirements which must be met by the chosen method of attachment:

"proper operation . . . requires that there be no slippage between any of the components at their interfaces. . . . Somewhat less obvious, but no less important, is the requirement that there be no inelastic strain in shaft 8 in any cross section which includes the transducer 4. Thus, all strains associated with the transmission of torque must be fully recoverable when the torque is relaxed."

and in column 16 beginning at line 5

"As already indicated, the transducer 4 and underlying shaft must act as a mechanical unit. Rigid attachment of the transducer 4 either directly or indirectly to shaft 8 is crucial to proper operation".

In fact, attachment by adhesive bonding (using known adhesives and known designs) or interference fit (Garshelis' preferred method) do not satisfy the above quoted requirements. All known designs based on adhesive bonding or interference result in peak stresses exceeding the capabilities of the bond.

In column 16 beginning at line 5 and continuing through line 23 of column 17 Garshelis discusses three categories of torsional engagements between the transducer and the shaft. The categories are 1) salient point, i.e. splines, knurls, teeth etc. at the ends of the transducer mating with similar features on the shaft; 2) distributed, i.e. adhesive bonding or interference fit; 3) diffuse, i.e. welding or brazing the ends of the transducer to the shaft. The first "1) salient point" and the last "3) diffuse" work well but manufacturing methods for achieving these attachments are not easily adapted to automotive manufacturing procedures.

About friction or adhesive bonding Garshelis states (column 16 lines 37 through 41):

"This bonding limits the maximum measurable torque to a lower value than might otherwise be handled by the shaft 8 alone or transducer 4 alone, but is advantageous for other reasons as indicated previously."

Accordingly, Garshelis expresses a known need for an "advantageous" process such as adhesive bonding that does not limit the maximum measurable torque to "a lower value than might otherwise be handled by the shaft 8 alone or transducer 4 alone". Garshelis goes on to state (column 16 lines 41 through 47):

"Press or shrink fits can be used to obtain the desired circular anisotropy, and can provide very substantial gripping forces which as a practical matter will not be broken by expected torques on shaft 8. With clean, degassed (and perhaps deoxidized) surfaces, the effective coefficient of friction can rise without limit and act somewhat like a weld."

Providing "clean, degassed (and perhaps deoxidized) surfaces" on the elements before they are joined by press or shrink fits is expensive and time consuming. It is difficult to assure such qualities in many millions of parts as required for automotive production. It is not stated in the Garshelis patent but it is believed that to achieve in a press fit an effective coefficient of friction that "can rise without limit and act somewhat like a weld" as stated in Garshelis the "clean, degassed (and perhaps deoxidized) surfaces" must be joined and heat treated at high temperatures in a suitable atmosphere for many hours. To obtain a shrink fit heat treatment is believed to be required both to achieve an effective coefficient of friction that "can rise without limit and act somewhat like a weld" and to cause the shrinkage required for a shrink fit.

Another method of achieving an interference fit between the transducer and the shaft is described by Garshelis with reference to FIGS. 14, 15 and 16. In this method the shaft is hollow and an expander is drawn through the shaft to expand it thereby providing the desired hoop stress. This process also is believed to be difficult and expensive to implement in mass production of steering wheel shafts.

The following numerical examples will clarify the issues related to attaching a sleeve by adhesive or interference fit (without heat treatment or other processes to achieve an effective coefficient of friction that "can rise without limit and act somewhat like a weld"). In column 10 lines 3 through 5 Garshelis cites the example of a shaft diameter of 0.5 inch (1.27 centimeters) and a transducer wall thickness in the 0.030 to 0.050 inch (0.076 centimeters to 0.127 centimeters) range. The wall thickness is important to achieve sufficient magnetic flux (Garshelis column 10 lines 24 through 31). From the well known fact that torque transmitted by a shaft is distributed as the third power of the radius it follows for the case of the aforementioned 0.5 inch diameter shaft that if the transducer and shaft have similar shear moduli (which is likely to be the case) 36 percent of the total torque will be transferred to the transducer in the case of 0.030 inch transducer wall thickness and 52 percent of the total torque will be transferred to the transducer in the case of 0.050 inch transducer wall thickness. A possible diameter of a steering wheel shaft of an automobile is 2 cm and it might be subjected to a maximum torque of 600 newton-meters (450 ft-lbs). Such a torque might be applied by a large healthy male driver after the wheel reached the end of its travel. At the one centimeter radius of the outer surface of the steering wheel shaft 600 newton-meters torque creates a tangential force of 60,000 newtons (13500 lbf). If 36 percent of the torque is transmitted to the transducer 21,600 newtons (4860 lbf) must be transferred between the transducer and the shaft by the attachment means. The fraction of the force transferred between the transducer and the shaft would be 36 percent in the case of the 2 centimeter diameter shaft if the inside diameter of the transducer is also 2 centimeters and the thickness of its wall is 1.2 millimeters (0.047 inches). The fraction would be much larger if the inside diameter of the transducer is larger and the thickness remains 1.2 millimeters. Assuming an adhesive shear strength of 10 newtons per square millimeter (1419 psi) and assuming means exist for providing constant shear stress over the area of adhesive attachment, transferring 21,600 newtons requires 21.6 square centimeters or 3.5 centimeters of shaft length of bonded area at each end of the transducer.

The second example is an interference fit. If the transducer wall thickness is 1.2 millimeters and is stressed to a hoop stress of 700 mpa (100,000 $lbf/in^2$) and the coefficient of friction is 0.3, 1575 newtons (353 lbf) of shear force can be transferred per millimeter of length. Transferring the aforementioned 21,600 newtons of shear force requires about 1.4 centimeters of shaft length of contact with the shaft at each end of the transducer.

In summary, in the case of a two centimeter diameter steering wheel shaft, both bonding by adhesive and attachment by press fit would require contact with the shaft for one to four axial centimeters beyond each end of the active area of the transducer to transmit the forces encountered in operation assuming uniform shear forces. To prevent higher stresses that would cause adherence to fail the shear force must be distributed uniformly over the area of attachment. In fact, known technology does not enable the hereinabove reproduced requirements (Garshelis column 16 lines 37 through 41 and column 16 lines 41 through 47) to be achieved with any amount of adhesive or conventional press fit adherence area because the shear stresses peak at the ends of the attachment regions and exceed the maximum shear capabilities of adhesives and/or press fits.

A substantial difference is now evident between "distributed attachment" (adhesive, friction) and "salient point attachment" and "diffuse attachment". In the latter two attachment is truly at the ends of the transducer and the transducer operates as a unit with the shaft. This is also true in the aforementioned case where the effective coefficient of friction rises without limit and acts somewhat like a weld which is believed to be properly categorized as a "diffuse attachment". In the "distributed attachment" cases attachment forces are required to be distributed over lengths of shaft such as the aforementioned one to four centimeter attachment regions at each end of the transducer.

It will also be appreciated from the above numerical examples taken with the following that where the transducer has a constant thickness as illustrated in FIGS. 1, 3, 4 and 6 through 16 of Garshelis (all of the figures that illustrate transducers) the end portions of the transducer do not "act as a mechanical unit" with the steering wheel shaft unless the ends are effectively welded to the shaft. For the transducer to "act as a mechanical unit" with the steering wheel shaft it must twist as the steering wheel shaft twists over its entire length. However, if a constant thickness transducer is attached by adhesive or press fit, sufficient torque to twist the transducer and cause it to "act as a mechanical unit" with the steering wheel shaft is only achievable in a "central region" between the aforementioned attachment regions. Outside the "central region" the torque available to twist the transducer diminishes with distance from the "central region" because the transmission of torque is "distributed" and the twisting of the transducer diminishes as the torque diminishes with distance from the central regions causing the torsional strain of the transducer and the shaft to be different far from the central regions. In Garshelis' words cited hereinabove: "This bonding limits the maximum measurable torque to a lower value than might otherwise be handled by the shaft 8 alone or transducer 4 alone."

An object of this invention is to provide a torque sensor transducer which can be attached by adhesive to a torque carrying shaft and which will then operate "as one" with the torque carrying shaft.

A general object of this invention is to provide a torque sensor which also overcomes certain disadvantages of the prior art.

SUMMARY OF THE INVENTION

The present invention provides a torque sensor for measuring the torque applied to a shaft. It comprises a magnetostrictive sleeve torsionally engaged with two shear levelers. The shear levelers are bonded by adhesive to the shaft. The shear levelers have flared ends and regions of varying torsional elasticity that operate to level the shear stress in the adhesive. The term "level" is used herein with reference to shear stress in adhesives to describe causing the shear stress to be constant and without peaks over the area bonded by adhesive. It may include being constant at two or more different levels at two or more areas bonded by adhesive.

Further, in accordance with the invention, the torque sensor is attached to the shaft by adhesive which is stressed in shear without stress peaks thereby enabling designs wherein the adhesive can transfer torques approaching the yield limit of the shaft.

Further, in accordance with the invention, the shear levelers have varying torsional stiffnesses to provide a uniform shear stress in the adhesive.

Further, in accordance with the invention, the shear levelers have flared ends and varying thickness adhesive at the flared ends further distributes stress in the adhesive and enables designs wherein the adhesive transmits torques that approach the yield torque of the shaft.

Further, in accordance with a first embodiment of the invention, low magnetic permeability isolation rings magnetically isolate the shear levelers from the magnetostrictive central segment.

Further, in accordance with the aforementioned first embodiment of the invention, the isolation rings are welded to the shear levelers and the magnetostrictive central segment.

Further, in accordance with the aforementioned first embodiment of the invention, the magnetostrictive central segment is pressed onto a stack of washers with crowned outer circumferences that maintains the transducer in its cylindrical shape and minimizes the torque that must be accumulated by the shear levelers. Great hoop stress in the magnetostrictive central segment is achieved by heat treatment after the magnetostrictive central segment is pressed onto the stack of washers.

Further, in accordance with the aforementioned first embodiment of the invention, each washer of the aforementioned stack of washers with crowned outer circumferences is coated with a thin layer of material that evaporates during heat treatment thereby leaving each washer separated from adjacent washers and therefore free to rotate without friction when the transducer is torsionally strained.

Further, in accordance with a second embodiment of the invention, the shear levelers are unitary with a low magnetic permeability middle segment upon which the magnetostrictive central segment is pressed and welded and possibly shrunk whereby great hoop stress in the magnetostrictive central segment is achieved which advantageously provides desirable magnetic properties.

Further, in accordance with the aforementioned second embodiment of the invention, the shear levelers are unitary with a low magnetic permeability middle segment upon which the magnetostrictive central segment is placed and welded and great hoop stress in the magnetostrictive central segment is achieved by expanding the middle segment and the magnetostrictive central segment together which advantageously provides desirable magnetic properties.

Further, in accordance with a third embodiment of the invention, the shear levelers are unitary with the magnetostrictive central segment and annular grooves are provided between the shear levelers and the magnetostrictive central segment. The grooves enhance magnetic anisotropy and provide surfaces against which force may be applied to facilitate installation of the transducer on the shaft.

Further, in accordance with the invention, a torque sensor comprises a circularly symmetric magnetic element centered on the rotation axis of a magnetostrictive element for providing a lower reluctance magnetic field path and less sensitivity to a bent shaft or other asymmetry.

A complete understanding of this invention may be obtained from the description that follows taken with the accompanying drawings.

BEST MODE FOR CARRYING OUT THE INVENTION

Figure 1:
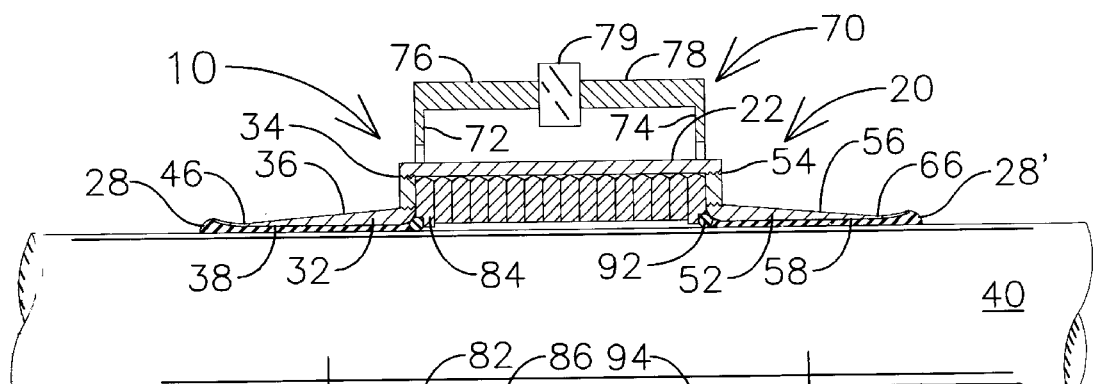
FIG. 1 shows a side view of a first embodiment of the torque sensor of the invention and a shaft with certain parts shown in section.

Referring now to FIG. 1, the torque sensor 10 comprises a torque transducer 20 bonded to a shaft 40 by adhesive 28 and 28'. During operation of the torque sensor 10 as the shaft 40 twists under torsional stress the torque transducer 20 twists without slippage between itself and shaft 40 because it levels the shear stress in adhesive 28 and 28'. The twisting of torque transducer 20 causes magnetostrictive effects to which a magnetostriction sensor 70 is responsive. In the preferred embodiment the twisting of torque transducer 20 causes a magnetic field. It will be appreciated as the description proceeds that the invention may be implemented in different embodiments.

Figure 2:
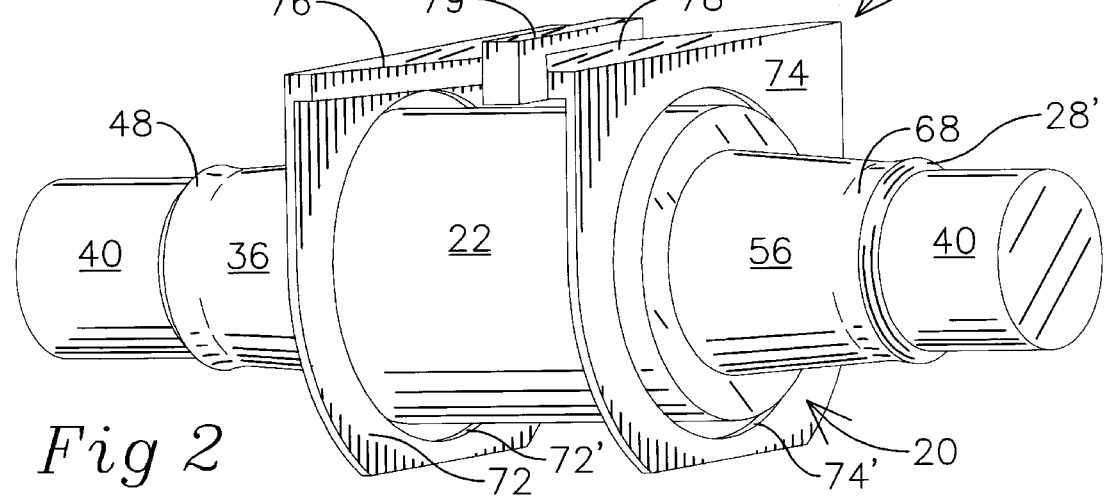
FIG. 2 shows a perspective view of the torque sensor of the invention as illustrated in FIG. 1.

Referring particularly to FIGS. 1 and 2, torque transducer 20 comprises a magnetostrictive sleeve 22 torsionally engaged to shear levelers 32 and 52 through low magnetic permeability collars 44 and 64 respectively. Shear leveler 32 has conical outer surface 36, cylindrical inside surface 38, and flared end 48. Shear leveler 52 has conical outer surface 56, cylindrical inside surface 58, and flared end 68. Magnetostrictive sleeve 22 is joined to collars 44 and 64 by welds 34 and 54 respectively. Shear levelers 32 and 52 are joined to collars 44 and 64 by welds 35 and 55 respectively. Torque transducer 20 may also include low magnetic permeability washers 84, 86 and 94 and "O" rings 82 and 92. Shaft 40 transmits torque and twists in proportion to the transmitted torque. An exemplary shaft 40 is the steering wheel shaft of an automobile.

Shear leveler 32 has a thickness 42 defined by outer surface 36 and inside surface 38. The thickness 42 varies between a minimum thickness at the beginning 46 of flared end 48 and a maximum thickness adjacent low magnetic permeability collar 44. Flared end 48 continues at constant thickness from its beginning 46 to or beyond where thickness 42 would be zero if outer surface 36 were extended to zero thickness.

Shear leveler 52 has a thickness 62 defined by outer surface 56 and inside surface 58. The thickness 62 varies between a minimum thickness at beginning 66 of flared end 68 and a maximum thickness adjacent low magnetic permeability collar 64. Flared end 68 continues at constant thickness from its beginning 66 to or beyond where thickness 62 would be zero if outer surface 56 were extended to zero thickness.

At their minima, thicknesses 42 and 62 are made as thin as practicable consistent with low cost manufacture. At their maxima, thicknesses 42 and 62 are made so that the torsional stiffnesses at the maximum thicknesses are equal to the torsional stiffness of magnetostrictive sleeve 22. The length of the conical portion of the shear levelers 32 and 52 is determined to provide sufficient area for adhesive 28 and 28' to transmit the anticipated force without exceeding its shear stress capability. For example, if the adhesive is capable of reliably transmitting 20 newtons per square millimeter in shear stress and the maximum anticipated torque results in a shear stress of 10000 newtons then the length of the conical portion would be determined to provide 500 square millimeters of adhesive attachment. The term torsional stiffness is used herein for the ratio of applied torque to twist per unit of length.

Ideally, the outer surfaces 36 and 56 of shear levelers 32 and 52 respectively would be shaped to maintain exactly constant shear stress in adhesive 28 and 28' in the regions between beginnings 46 and 66 of flared ends 48 and 68 and collars 44 and 64 respectively. However, for applications where such as a ten to twenty percent variation in adhesive shear stress is acceptable, outer surfaces 36 and 56 may be exactly conical for simplicity of manufacture. If it is desired that the outer surfaces 36 and 56 be formed for exactly constant shear stress in adhesive 28 and 28' then the shape can be calculated directly by those adept in the art of stress analysis. A method for obtaining approximately constant shear stress in adhesive 28 and 28' is to iterate the shape of surfaces 36 and 56 by trial and error using any of the finite element computer codes able to calculate the stress in adhesive 28 and 28'.

The flared ends 48 and 68 are shaped to provide adhesive thicknesses that increase with the squares of the distances from the positions 46 and 66 where the flares begin. It should be noted that the thickness of adhesive 28 and 28' is approximately zero except at flared ends 48 and 68. The illustrated thickness is only for the purpose of illustrating the presence of adhesive 28 and 28'. The rate of flare of flared ends 48 and 68 is dependent on the torsional stiffness of flared ends 48 and 68 and the shear modulus of the selected adhesive 28 and 28'. The rate of flare is determined so that the shear stress in adhesive 28 and 28' at flared ends 48 and 68 is the same or less than the shear stress at adhesive 28 and 28' where thicknesses 42 and 62 are constant. For one or both of the following two reasons it may be necessary for the shear stress in adhesive 28 and 28' to be two or three times less at flared ends 48 and 68 than at the conical portions of shear levelers 32 and 52. The first reason is that filing the space at the flared ends 48 and 68 requires an adhesive capable of filling large voids and such an adhesive may have lower shear strength than the adhesive used elsewhere. The second reason is that greater strength is often achieved where adhesive attachment is accompanied by an interference fit. If the designer provides an interference fit where the thicknesses 42 and 62 of adhesive 28 and 28' are constant the design may provide for greater shear stress in adhesive 28 and 28' at the regions of interference fit than at flared ends 48 and 68. Adhesive 28 and 28' may be pressurized during curing at flared ends 48 and 68 to cause flared ends 48 and 68 to be slightly stretched so they do not expand under thermal cycling and place adhesive 28 and 28' under tension.

Adhesive 28 and 28' may be any adhesive known to be suitable by those skilled in the adhesive art or found by experiment to be suitable. Many epoxy based adhesives should perform well. Many anaerobic and acrylic adhesives should also work well. A particular consideration is the need to work under conditions of high volume production and for this requirement recommendations may be obtained from any of the well known adhesive manufacturers. As an example, Master Bond Incorporated located at 154 Hobart Street in Hackensack, N.J. makes a broad line of epoxy based adhesives many of which are used in high volume production applications. In applications where adhesive 28 and 28' is immersed in oil the adhesives designated by the numbers 603, 620, 638, 648 and 660 supplied by Loctite Corporation selected according to the operating temperature and shaft clearance should perform well. One preferred design uses Loctite 603 where shaft 40 is close to the inside surfaces 38 and 58 because it performs well where the gap is small and uses Loctite 638 at flared ends 48 and 68 because it performs well in larger gaps. Many other adhesives are known to those skilled in the art of adhesive joining and may perform well in this application.

Shear levelers 32 and 52 are made of a material that will not yield under the maximum strain encountered at the surface of shaft 40 and has a thermal expansion coefficient similar to the thermal expansion coefficient of shaft 40. In the case where shaft 40 is steel a preferred material is medium carbon tempered steel. Low magnetic permeability collars 44 and 64 are preferably made of a nonmagnetic metal such as a 300 series stainless steel or a copper alloy. The slightly larger thermal expansion coefficient of the aforementioned metals requires an interference fit between shaft 40 and shear levelers 32 and 52 near low magnetic permeability collars 44 and 64 with sufficient interference that thermal expansion of the collars 44 and 64 does not create tensile stress on adhesive 28 and 28' over the anticipated operating temperatures.

Shear levelers 32 and 52 are preferably welded by spin (inertial) welding to low magnetic permeability collars 44 and 64 respectively. Spin welding is preferred for its minimal and localized heating. Spin welding is further preferred for its ability to join dissimilar metals. Any other welding process known to be suitable by those skilled in the relevant arts may be substituted.

Low magnetic permeability washers 84, 86 and 94 are pressed into magnetostrictive sleeve 22. Low magnetic permeability washers 84, 86 and 94 have a crowned surface on their circumference thereby limiting their contact with magnetostrictive sleeve 22 to the center of the outside of each washer. Low magnetic permeability washers 84, 86 and 94 are made of a nonmagnetic material having a thermal expansion coefficient matching magnetostrictive sleeve 22 for maintaining hoop stress in magnetostrictive sleeve 22 over all temperatures. The interference between low magnetic permeability washers 84, 86 and 94 and magnetostrictive sleeve 22 insures magnetostrictive sleeve 22 remains cylindrical under all operating conditions and may enhance the magnetic anisotropy of magnetostrictive sleeve 22. Therefore, the interference should be great enough to accomplish both purposes.

The following describes a preferred method of manufacture when magnetostrictive sleeve 22 is made of maraging steel: Low magnetic permeability washers 84, 86 and 94 are coated with a thin organic coating selected to evaporate at high temperatures and leave minimal residue. The coated washers are pressed into magnetostrictive sleeve 22 and low magnetic permeability collars 44 and 64 are attached to magnetostrictive sleeve 22. The assembly is then heat treated to develop the magnetostrictive properties of magnetostrictive sleeve 22. The heating also causes the coating to evaporate leaving each of the low magnetic permeability washers 84, 86 and 94 slightly separated from its neighbors and, therefore, free to rotate without friction against its neighbors when sleeve 22 twists during operation. After heat treatment is complete, magnetostrictive sleeve is circumferentially magnetized by passing a large current along its axis. This current is preferably large enough to fully magnetize sleeve 22. If a different magnetization is required the magnetization is adjusted downward by repeatedly applying current in alternate directions to achieve the desired circumferential magnetization.

Low magnetic permeability collars 44 and 64 are preferably welded by spin (inertial) welding to magnetostrictive sleeve 22. Spin welding is preferred for its minimal and localized heating. Spin welding is further preferred for its ability to join dissimilar metals. Any other welding process known to be suitable by those skilled in the relevant arts may be substituted.

The completed torque transducer 20 is preferably attached to shaft 40 by pressing transducer 20 onto shaft 40 after applying adhesive to either or both the inside surfaces of shear levelers 32 and 52 and the outside diameter of shaft 40. It is desirable to provide as much interference as practicable between shaft 40 and shear levelers 32 and 52 because the greatest adhesion is obtained thereby. After pressing transducer 20 onto shaft 40 and before the adhesive has cured additional adhesive is applied to fill the space between shaft 40 and flared ends 48 and 68 and provide varying thickness adhesive at the ends of flared ends 48 and 68. The inside surfaces of shear levelers 32 and 52 and the mating surfaces on shaft 40 may be very slightly tapered so the full interference fit happens only in the final position.

Alternately, adhesive 28 and 28' may be forced between shaft 40 and shear levelers 32 and 52 after transducer 20 is located on shaft 40. "O" rings 82 and 92 limit adhesive 28 and 28' to the areas where bonding is desired.

Magnetostriction sensor 70 comprises high magnetic permeability yokes 72 and 74, magnetic flux concentrators 76 and 78 and magnetic field sensor 79. The yokes and magnetic flux concentrators of magnetostriction sensor 70 may be made of any material having high magnetic permeability and low hysteresis. Silicon steel appropriate for motor and transformer laminations offers good magnetic performance at low cost. Many other commercially available materials offer lower hysteresis at higher cost for reducing hysteresis in the response of the sensor. The magnetic field sensor 79 may be any of many commercially available semiconductor sensors providing a signal indicating the applied magnetic field. Hall effect based sensors are widely available at low cost. A preferred device is model MLX90215 available from Melexis, 15 Sutton Road, Webster, Mass. Structural members (not illustrated) may be provided for mounting. One preferred method of providing a mounting structure is to place the components of magnetostriction sensor 70 with or without magnetic field sensor 79 in a mold and inject plastic around them.

Column 10 line 67 through column 11 line 53 of the aforementioned Garshelis patent, reproduced below, lists materials suitable for magnetostrictive sleeve 22. The reader should keep in mind that "transducer 4" copied below from the Garshelis patent corresponds to the magnetostrictive sleeve 22 of FIGS. 1 and 2 (also sleeve 122 of FIG. 3 and sleeve 222 of FIGS. 4 through 6).

... In the most preferred embodiment, the transducer 4 is constructed of nickel maraging steel such as 18% nickel maraging steel.

The material selected must be ferromagnetic to assure the existence of magnetic domains and must be magnetostrictive in order that the orientation of the magnetization may be altered by the stresses associated with an applied torque.

Materials other than nickel maraging steel may also be appropriate depending on the characteristics of the application. Materials should be chosen in view of the following general criteria.

In the transducer application, the field which arises with the torque is due to the discontinuity in the axial component of magnetization at the two ends of the active region. These ends effectively become the poles of a bar magnet. This field will increase with the saturation magnetization, $M_s$, of the active material. The larger that $M_s$ becomes, the larger the discontinuity . . . .

The polarization is maintained against disturbing fields by the quiescent anisotropy $K_q$. Therefore, a larger $K_q$ is preferable. However, the magnetization is reoriented by stress more easily (requiring less torque) when $Lambda_s/K_q$ is large, where $Lambda_s$ is the saturation magnetostriction.

Therefore, if high sensitivity is desired, Lambdas should be large relative to $K_q$. If a large dynamic range is desired, $Lambda_s/K_q$ should be small enough for $(Lambda_s)(Sigma)/K_q$ to stay within the linear range at the highest required torque.

Other materials that substantially fulfill these criteria and therefore may be used to construct transducer 4 include the following:

Other nickel maraging steels.

Other nickel-iron alloys, including both binary alloys and steels. The binary alloys must include higher nickel (40%–50%) alloys, while steels may include 9-4-20 or AISI 9310.

Aluminum maraging steels that typically contain 13% aluminum, such as Alfer (13% Al—Bal Fe).

Manganese maraging steels that have the advantage of being less expensive than nickel maraging steels.

Permendur type alloys, such as 49Co 49Fe 2V, with very high magnetostriction. Vanadium can be added to make the material easier to work with and to increase its strength. Similar alloys with a lower cobalt content may be used.

Martensitic stainless steel, including straight chromium types such as 410, 416 or 440.

Ferritic stainless steel, such as AISI 430.

Precipitation hardening stainless steel, such as 15-5 PH or 17-4 PH.

Amorphous and nanocrystalline materials.

Column 11 line 54 through column 12 line 61 of the aforementioned Garshelis patent, reproduced below, recites of ways to achieve the magnetic anisotropy required for magnetostrictive sleeve 22. The reader should keep in mind that "transducer 4" copied below from the Garshelis patent corresponds to the magnetostrictive sleeve 22 of FIGS. 1 and 2 (also sleeve 122 of FIG. 3 and sleeve 222 of FIGS. 4 through 6). Also, the reader should keep in mind that shaft 8 in the Garshelis patent corresponds to middle segment 130 described hereinafter with reference to FIG. 3.

Transducer 4 can be constructed in its basic shape from the selected material by any suitable material working process. Following formation of transducer 4, two steps are performed to impose the desired circumferential magnetic field orientation on the material of transducer 4. First, transducer 4 is endowed, by prior processing or as a collateral effect of its attachment to shaft 8 with an effective uniaxial magnetic anisotropy having the circumferential direction as the easy axis. Second, transducer 4 must be polarized in one or the other circumferential direction.

The first step in setting up the required magnetic field orientation is to impose circumferential quiescent magnetic anisotropy on the structure of transducer 4. To obtain efficient use of all of the magnetic domains, i.e. the entire volume of transducer 4, the quiescent anisotropy in each should not depart more than 45 degrees from the circumferential direction. For every magnetic domain to work with equal effectiveness and symmetrically for both clockwise and counterclockwise torques, they should all be purely circular, i.e. precisely in the circumferential direction. However, absolute perfection in this regard is not required to obtain good operating results; it is necessary only that the magnetic orientation in each domain be within 45 degrees of ideal.

Magnetic anisotropy is preferably produced by physical working of the material of transducer 4. Any physical source of magnetic anisotropy can be used, alone or in combination, to attain the desired distribution of quiescent domain orientations, being circumferential within plus or minus 45°. One source of magnetic anisotropy is magnetocrystalline i.e, "crystal anisotropy," which refers to the preferred orientation of the magnetic moments ("spins") of the atoms (ferromagnetic atoms) in directions correlated with the axis which define the crystal structure. A second source of magnetic anisotropy is directional order, which refers to the distribution of atomic species, lattice defects, inclusions (exclusions) or other chemical or structural features found in one direction (or more than one but not all). A third source of magnetic anisotropy is magnetoelastic, which is associated with the directionality of stress in materials having a spontaneous magnetostrictive strain correlated with their spontaneous magnetic moment (magnetostriction-ferromagnetic). A fourth source of magnetic anisotropy is shape of the material, which is associated with the divergence of M at material boundaries. Specifically, a demagnetizing field arises from the "poles" of a magnetized body, and is more intense if the poles are closely spaced. Shapes other than spherical shapes inherently have some axes which are magnetically "easier" than others.

Any or all of these physical sources of anisotropy can be used in constructing transducer 4. As an example, crystal texture arises from various combinations of mechanical working and heat treating. Mechanical working, such as rolling, tends to align the crystals since they have anisotropic strengths and stiffnesses. Thus, the desired magnetic anisotropy could be introduced by cold rolling transducer 4 between two closely spaced working rollers rotating about axes parallel to the central longitudinal axis of transducer 4 . . . . Subsequent heat treatment of previously rolled materials causes recrystallization, with crystal growth in the directions reflecting the rolling direction, so that the desired anisotropy is enhanced. As another example, the outer surface 24 of transducer 4 can be rolled (or machined) to have a series of circumferential ridges and troughs (a circumferential knurl) in order to develop shape anisotropy (with or without stress anisotropy).

The operation of the torque sensor 10 of the invention will now be described with reference to FIGS. 1 and 2.

When a torque is applied to shaft 40 it twists slightly. Between the ends of torque transducer 20 the torsional stiffness of torque transducer 20 and the torsional stiffness of shaft 40 add to create a total torsional stiffness. Proceeding from left to right in FIGS. 1 and 2 the total torsional stiffness increases between the rim of flared end 48 and collar 44 from the torsional stiffness of shaft 40 alone to the sum of the torsional stiffness of shaft 40 and the torsional stiffness of shear leveler 32 adjacent collar 44. Adhesive 28 is uniformly stressed per unit of area to transfer a constant amount of torque per unit of axial distance from shaft 40 to shear leveler 32 of torque transducer 20. The torque transferred by adhesive 28 accumulates to cause a linearly increasing torque in shear leveler 32, first in flared end 48 and then in increasing thickness 42.

The elements to the right of magnetostrictive sleeve 22 are the mirror image of the elements to the left of magnetostrictive sleeve 22 which enables their operation to be described similarly by proceeding from right to left. Proceeding from right to left in FIGS. 1 and 2 the total torsional stiffness increases between the rim of flared end 68 and collar 64 from the torsional stiffness of shaft 40 alone to the sum of the torsional stiffness of shaft 40 and the torsional stiffness of shear leveler 52 adjacent collar 64. Adhesive 28' is uniformly stressed per unit of area to transfer a constant amount of torque per unit of axial distance from shaft 40 to shear leveler 52 of torque transducer 20. The torque transferred by adhesive 28' accumulates to cause a linearly increasing (going from right to left) torque in shear leveler 52, first in flared end 68 and then in the increasing thickness 62.

At flared ends 48 and 68 the shear stress in adhesive 28 and 28' is constant because the varying thickness of adhesive 28 and 28' and the torsional stiffness of flared ends 48 and 68 combine to provide constant shear stress.

Between beginning 46 of flared end 48 and collar 44 the shear stress in adhesive 28 is constant because the torsional stiffness of shear leveler 32 increases with axial distance at a rate that provides constant shear stress.

Between collar 64 and beginning 66 of flared end 68 the shear stress in adhesive 28' is constant because the torsional stiffness of shear leveler 52 decreases with axial distance at a rate that provides constant shear stress.

Minimizing thicknesses 42 and 62 at flared ends 48 and 68 respectively (as specified hereinabove) minimizes the energy that must be accommodated by adhesive 28 and 28' at flared ends 48 and 68 respectively which reduces the amount of adhesive required and enables a thinner and therefore more structurally sound adhesive bond.

Collars 44 and 64 transfer torque from the thickest parts of shear levelers 32 and 52 respectively to magnetostrictive sleeve 22 and magnetically isolate magnetostrictive sleeve 22 from shaft 40 and shear levelers 32 and 52. Between collars 44 and 64 the total torsional stiffness remains constant and the applied torque is shared between shaft 40 and magnetostrictive sleeve 22 and both twist equally. Washers 84, 86 and 94 apply outward stress to magnetostrictive sleeve 22 but are free to rotate relative to each other whereby they do not apply torque to magnetostrictive sleeve 22. This is advantageous relative to other methods of stressing magnetostrictive sleeve 22 because other methods such as middle segment 130 illustrated in FIG. 3 receive some of the torque directed toward magnetostrictive sleeve 22 and reduce the output of magnetostrictive sensor 70.

In the preferred design wherein magnetostrictive sleeve 22 is magnetized circumferentially, applying torque about its axis of rotational symmetry causes it to produce magnetic poles on its axis near its ends thus causing it to resemble a bar magnet. The strength of the poles is proportional to the amount of torsional strain which is proportional to the applied torque. The magnetic poles cause magnetic flux to enter yokes 72 and 74 at surfaces 72' and 74' and pass through magnetic flux concentrators 76 and 78 and semiconductor magnetic field sensor 79. Magnetic field sensor 79 produces an electric signal proportional to the field through itself and, therefore, proportional to the applied torque. Other sensors responsive to torsional stress in a sleeve may be substituted for magnetostriction sensor 70.

Figure 3:
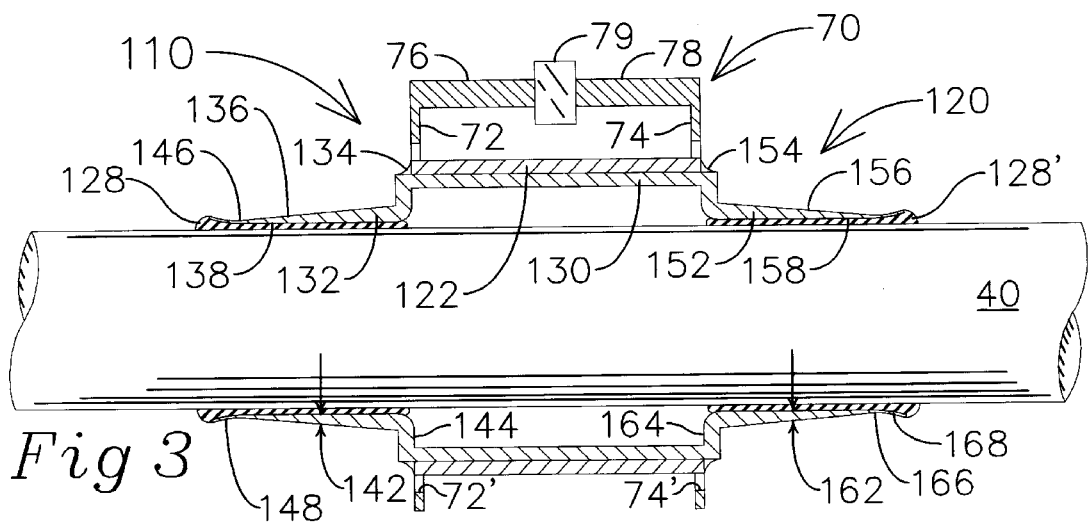
FIG. 3 shows a side view of a second embodiment of the torque sensor the invention mounted on a shaft with certain parts shown in section.

Continuing now with reference to FIGS. 1 and 3, a second embodiment of the torque sensor of the invention is disclosed. Torque sensor 110 comprising torque transducer 120 illustrated in FIG. 3 is similar to torque sensor 10 comprising torque transducer 20 illustrated in FIG. 1 except that middle segment 130 replaces washers 84, 86 and 94 to maintain the magnetostrictive sleeve 122 in a radially stressed state. Shaft 40 and magnetostriction sensor 70 illustrated in FIG. 3 are the same as shaft 40 and magnetostriction sensor 70 illustrated in FIGS. 1 and 2 and fully described hereinabove with reference to FIGS. 1 and 2. Adhesive 128 and 128' may be the same material as adhesive 28 and 28' which was fully described hereinabove in the description of the invention with reference to FIGS. 1 and 2.

Figure 4:
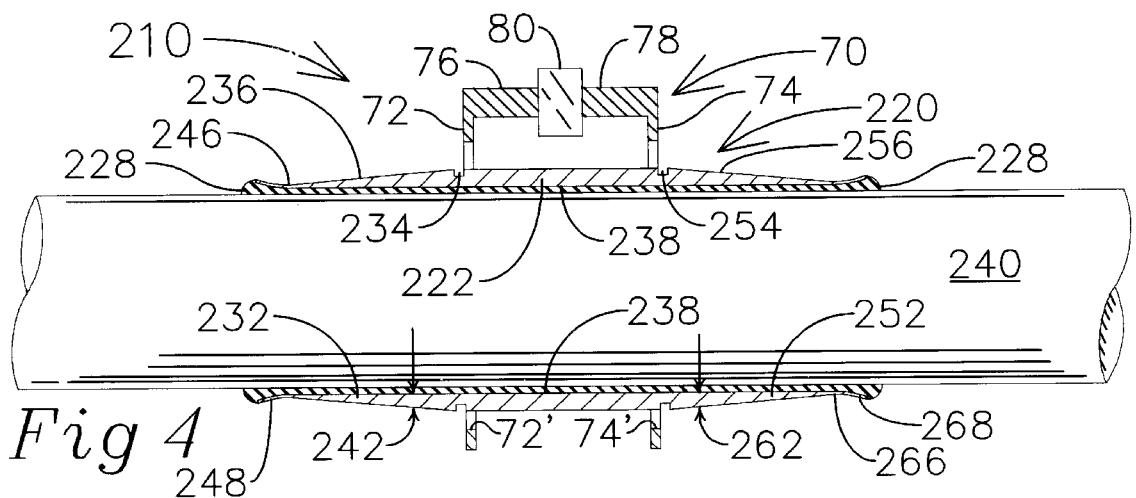
FIG. 4 shows a side view of a third embodiment of the torque sensor the invention mounted on a shaft with certain parts shown in section.
Figure 5:
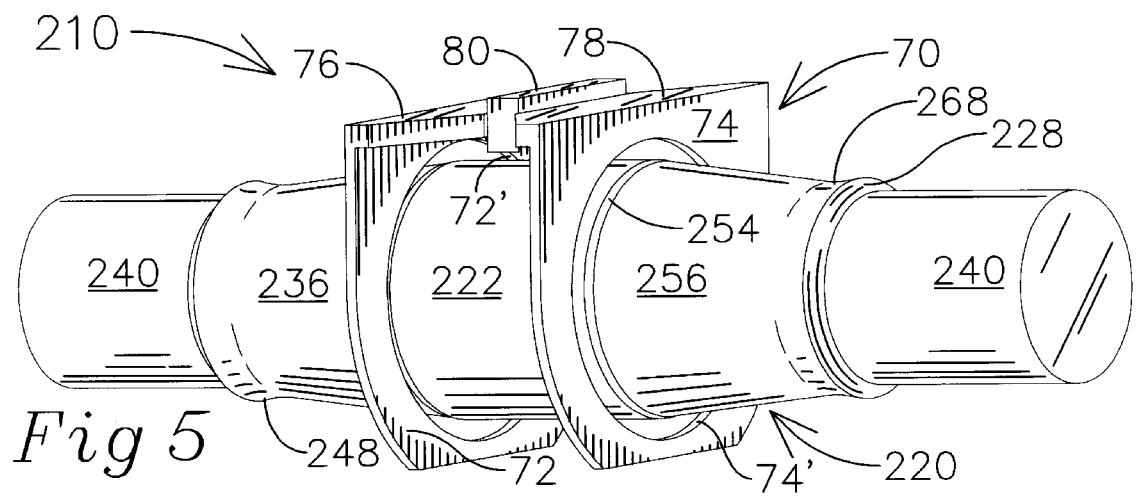
FIG. 5 shows a perspective view of the third embodiment of the torque sensor of the invention illustrated in FIG. 4.

Proceeding now to describe the second embodiment of the invention with reference to FIG. 3, torque transducer 120 comprises a magnetostrictive sleeve 122 being radially stressed by middle segment 130 and welded at its ends to shear levelers 132 and 152 by welds 134 and 154 respectively. Middle segment 130 is unitary with shear levelers 132 and 152. The radial stress on magnetostrictive sleeve 122 may be achieved by pressing it onto middle segment 130 and/or by drawing an expander through middle segment 130 or by other methods known to those skilled in the appropriate arts. A preferred process for achieving hoop stress is to shrink magnetostrictive sleeve 122 onto middle segment 130 by heat treating the assembled pair. As inferred from the Garshelis patent cited hereinabove, with clean, degassed (and perhaps deoxidized) surfaces, the heat treating process may also achieve the equivalent of a weld, thus making welds 134 and 154 unnecessary. Middle segment 130 may stress magnetostrictive sleeve 122 radially sufficiently to cause or augment magnetic anisotropy in magnetostrictive sleeve 122. Shear leveler 132 has conical outer surface 136, cylindrical inside surface 138, collar 144 and flared end 148. Shear leveler 152 has conical outer surface 156, cylindrical inside surface 158, collar 164 and flared end 168. Torque transducer 120 is bonded to shaft 40 by adhesive 128 and 128'. Shaft 40 is made of a high magnetic permeability steel such as is commonly used in the steering wheel shafts of automobiles. If shaft 40 is made of a low magnetic permeability or nonmagnetic material simpler designs such as are described herein with reference to FIGS. 4 and 5 are preferred for their simplicity relative to the designs illustrated in FIGS. 1 through 3.

Shear leveler 132 has a thickness 142 defined by outer surface 136 and inside surface 138. The thickness 142 varies between a minimum thickness at start 146 of flared end 148 and a maximum thickness adjacent collar 144. Flared end 148 continues at constant thickness from its beginning 146 to or beyond where thickness 142 would be zero if outer surface 136 were extended to zero thickness.

Shear leveler 152 has a thickness 162 defined by outer surface 156 and inside surface 158. The thickness 162 varies between a minimum thickness at start 166 of flared end 168 and a maximum thickness adjacent collar 164. Flared end 168 continues at constant thickness from its beginning 166 to or beyond where thickness 162 would be zero if outer surface 156 were extended to zero thickness.

At their minima, thicknesses 142 and 162 are made as thin as practicable consistent with low cost manufacture. At their maxima, thicknesses 142 and 162 are made so that the torsional stiffnesses at the maximum thicknesses are equal to the torsional stiffness of the combination of magnetostrictive sleeve 122 and middle segment 130. The length of the conical portion of the shear levelers 132 and 152 is determined to provide sufficient area for adhesive 128 and 128' to transmit the anticipated force without exceeding its shear stress capability. For example, if the adhesive is capable of reliably transmitting 20 newtons per square millimeter in shear stress and the maximum anticipated torque results in a shear stress of 10000 newtons then the length of the conical portion would be determined to provide 500 square millimeters of adhesive attachment.

Ideally, the outer surfaces 136 and 156 of shear levelers 132 and 152 respectively would be shaped to maintain exactly constant shear stress in adhesive 128 and 128' in the regions between the beginnings 146 and 166 of flared ends 148 and 168 and collars 144 and 164 respectively. However, for applications where ten to twenty percent variation in adhesive shear stress is acceptable, outer surfaces 136 and 156 may be exactly conical for simplicity of manufacture. If it is desired that the outer surfaces 136 and 156 be formed for exactly constant shear stress in adhesive 128 and 128' then the shape can be calculated directly by those adept in the art of stress analysis. A method for obtaining constant shear stress in adhesive 128 and 128' is to iterate the shape of surfaces 136 and 156 by trial and error using a finite element computer code able to calculate the stress in adhesive 128 and 128'.

The flared ends 148 and 168 are shaped to provide adhesive thicknesses that increase with the squares of the distances from the positions 146 and 166 where the flares begin. It should be noted that the thickness of adhesive 128 and 128' is approximately zero except at flared ends 148 and 168. The illustrated thickness is only for the purpose of illustrating the presence of adhesive 128 and 128'. The rate of flare of flared ends 148 and 168 is dependent on the torsional stiffness of flared ends 148 and 168 and the shear modulus of the selected adhesive 128 and 128'. The rate of flare is determined so that the shear stress in adhesive 128 and 128' at flared ends 148 and 168 is the same or less than the shear stress in adhesive 128 and 128' where thicknesses 142 and 162 of adhesive 128 and 128' are constant. For one or both of the following two reasons it may be necessary for the shear stress in adhesive 128 and 128' to be two or three times less at flared ends 148 and 168 than at the conical portions of shear levelers 132 and 152. The first reason is that filling the space at the flared ends 148 and 168 requires an adhesive capable of filling large voids and such an adhesive may have lower shear strength than the adhesive used elsewhere. The second reason is that greater strength is often achieved where adhesive attachment is accompanied by an interference fit. If the designer provides an interference fit where the thicknesses 142 and 162 of adhesive 128 and 128' are constant the design may provide for greater shear stress at the regions of interference fit than at flared ends 148 and 168 where an interference fit is not possible. Adhesive 128 and 128' may be pressurized during curing at flared ends 148 and 168 to cause flared ends 148 and 168 to be slightly stretched so they do not expand under thermal cycling which would place adhesive 128 and 128' under tension. A moderate pressure such as 3 mpa (450 psi) is likely to be sufficient and not cause uncured adhesive to flow between shaft 40 and inside surfaces 138 and 158.

Adhesive 128 and 128' may be any adhesive known to be suitable by those skilled in the adhesive art or found by experiment to be suitable. The same adhesives identified hereinabove with reference to FIGS. 1 and 2 as suitable for adhesive 28 and 28' are believed to be suitable for adhesive 128 and 128'.

Middle segment 130 is made of a low magnetic permeability metal having a thermal expansion coefficient similar to the thermal expansion coefficient of magnetostrictive sleeve 122. Many nickel based alloys that do not contain iron such as certain of the alloys sold under the trade names Hastalloy, Monel and Inconel are appropriate because they are nonmagnetic and have low thermal expansion coefficients. Shear levelers 132 and 152 are made of a nonmagnetic material matching the thermal expansion coefficient of shaft 140 and which will not yield under the maximum anticipated strain. A 300 series stainless steel or a copper alloy offers low cost but its larger thermal expansion coefficient requires an interference fit between shaft 40 and shear levelers 132 and 152 to insure that thermal expansion does not create radial tension in adhesive 128 and 128' at temperatures within the anticipated operating temperature range. Certain aluminum ceramic composites offer high strength and thermal expansion coefficients approximating that of a steel shaft.

Magnetostrictive sleeve 122 may be welded to segments 132 and 152 by any suitable welding process for the materials involved such as laser welding, arc welding or press fitting and heat treating as mentioned hereinabove citing Garshelis. Magnetostrictive sleeve 122 may be made of any of the materials identified hereinabove with reference to FIGS. 1 and 2 as suitable for magnetostrictive sleeve 22 and the required anisotropy may be imparted by any of the processes for imparting anisotropy described hereinabove with reference to FIGS. 1 and 2.

The operation of the torque sensor 110 of the invention will now be described with reference to FIG. 3.

When a torque is applied to shaft 40 it twists slightly. Between the ends of torque transducer 120 the torsional stiffness of torque transducer 120 and the torsional stiffness of shaft 40 add to create a total torsional stiffness. Proceeding from left to right in FIG. 3 the total torsional stiffness increases between the rim of flared end 148 and collar 144 from the torsional stiffness of shaft 40 alone to the sum of the torsional stiffness of shaft 40 and the torsional stiffness of shear leveler 132 adjacent collar 144. Adhesive 128 is uniformly stressed per unit of area to transfer a constant amount of torque per unit of axial distance from shaft 40 to shear leveler 132 of torque transducer 120. The torque transferred by adhesive 128 accumulates to cause a linearly increasing torque in shear leveler 132, first in flared end 148 and then in increasing thickness 142.

The elements to the right of magnetostrictive sleeve 122 are the mirror image of the elements to the left of magnetostrictive sleeve 122 which enables their operation to be described similarly by proceeding from right to left. Proceeding from right to left in FIG. 3 the total torsional stiffness increases between the rim of flared end 168 and collar 164 from the torsional stiffness of shaft 40 alone to the sum of the torsional stiffness of shaft 40 and the torsional stiffness of shear leveler 152 at collar 164. Adhesive 128' is uniformly stressed per unit of area to transfer a constant amount of torque per unit of axial distance from shaft 40 to shear leveler 152 of torque transducer 120. The torque transferred by adhesive 128' accumulates to cause a linearly increasing (going from right to left) torque in shear leveler 152, first in flared end 168 and then in the increasing thickness 162.

At flared ends 148 and 168 the shear stress in adhesive 128 and 128' is constant because the varying thickness of adhesive 128 and 128' and the torsional stiffness of flared ends 148 and 168 combine to provide constant shear stress.

Between beginning 146 of flared end 148 and collar 144 the shear stress in adhesive 128 is constant because the torsional stiffness of shear leveler 132 increases with axial distance at a rate that provides constant shear stress.

Between collar 164 and beginning 166 of flared end 168 the shear stress in adhesive 128' is constant because the torsional stiffness of shear leveler 152 decreases with axial distance at a rate that provides constant shear stress.

Minimizing thicknesses 142 and 162 at flared ends 148 and 168 respectively minimizes the energy that must be accommodated by adhesive 128 and 128' at flared ends 148 and 168 which reduces the amount of adhesive required and enables a thinner and therefore more structurally sound adhesive bond.

Collars 144 and 164 transfer torque from shear levelers 132 and 152 respectively to middle segment 130 and magnetostrictive sleeve 122. Between collars 144 and 164 the total torsional stiffness remains constant and the applied torque is shared between shaft 40, middle segment 130 and magnetostrictive sleeve 122 and all twist equally.

In the preferred design wherein magnetostrictive sleeve 122 is magnetized circumferentially, applying torque about its axis of rotational symmetry causes it to produce magnetic poles on its axis thus causing it to resemble a bar magnet. The strength of the poles is proportional to the amount of torsional strain which is proportional to the applied torque. The magnetic poles cause magnetic flux to enter yokes 72 and 74 at surfaces 72' and 74' and pass through magnetic flux concentrators 76 and 78 and semiconductor magnetic field sensor 79. The flux through semiconductor magnetic field sensor 79 causes it to produce an electric signal proportional to the field through itself and, therefore, proportional to the applied torque. Other sensors responsive to torsional stress in a sleeve may be substituted for magnetostriction sensor 70.

Continuing now with reference to FIGS. 1 and 4, a third embodiment of the torque sensor of the invention, torque sensor 210 comprising torque transducer 220 illustrated in FIG. 4 differs from torque sensor 10 comprising torque transducer 20 illustrated in FIG. 1 in that torque transducer 220 is a single piece of magnetostrictive metal. This embodiment of the invention is suitable for applications wherein shaft 240 is made of low magnetic permeability material so that it is not necessary to magnetically isolate magnetostrictive sleeve 222 from shaft 240. Shear levelers 232 and 252 instead of being made of low magnetic permeability material may be of the same material as magnetostrictive sleeve 222. However, as a practical matter, the longer length of torque transducer 210 may make it more difficult to treat it as described hereinabove with reference to FIGS. 1 and 2 to impart the required magnetic anisotropy. Therefore, for the above reason and because of reduced material cost it may be less expensive to prepare the part of magnetostrictive sleeve 222 between circumferential grooves 234 and 254 to impart magnetic anisotropy and then weld shear levelers 232 and 252 to it by such as electron beam welding or inertial welding in which case the shear levelers 232 and 252 may be preferably made of a metal selected to have a thermal expansion coefficient that is approximately the same as the thermal expansion coefficient of shaft 240 and the material of shear levelers 232 and 252 may also be nonmagnetic. The same adhesives identified hereinabove with reference to FIGS. 1 and 2 as suitable for adhesive 28 and 28' are likely to be suitable for adhesive 228. Different adhesives may be required for compatibility with the metals selected for shaft 240 and shear levelers 232 and 252.

Proceeding now to describe the third embodiment of the invention with reference to FIG. 4, the torque sensor 210 comprises a torque transducer 220 bonded to a shaft 240 by adhesive 228. During operation of the torque sensor 210 as the shaft 240 twists under torsional stress the torque transducer 220 twists without slippage between itself and shaft 240. The twisting of torque transducer 220 causes magnetostrictive effects to which a magnetostriction sensor 70 is responsive. In the preferred embodiment the twisting of torque transducer 220 causes a magnetic field.

Referring particularly to FIGS. 4 and 5, torque transducer 220 comprises a magnetostrictive sleeve 222 unitary with shear levelers 232 and 252. Torque transducer 220 is separated from shear levelers 232 and 252 by circumferential grooves 234 and 254 respectively. Magnetostrictive sleeve 222 and shear levelers 232 and 252 have a common inside surface 238. Shear leveler 232 has a conical outer surface 236 and flared end 248. Shear leveler 252 has a conical outer surface 256 and a flared end 268.

Shear leveler 232 has a thickness 242 defined by outer surface 236 and inside surface 238. The thickness 242 varies between a minimum thickness at start 246 of flared end 248 and a maximum thickness at groove 234. Flared end 248 continues at constant thickness from its beginning 246 to or beyond where thickness 242 would be zero if outer surface 236 were extended to zero thickness.

Shear leveler 252 has a thickness 262 defined by outer surface 256 and inside surface 238. The thickness 262 varies between a minimum thickness at start 266 of flared end 268 and a maximum thickness at groove 254. Flared end 268 continues at constant thickness from its beginning 266 to or beyond where thickness 262 would be zero if outer surface 256 were extended to zero thickness.

At their minima, thicknesses 242 and 262 are made as thin as practicable consistent with low cost manufacture. At their maxima, thicknesses 242 and 262 are made so that the torsional stiffnesses at the maximum thicknesses are equal to the torsional stiffness of magnetostrictive sleeve 222. If shear levelers 232 and 252 and magnetostrictive sleeve 222 are made of the same material or materials having the same shear modulus then, at their maxima, thicknesses 242 and 262 are equal to the thickness of magnetostrictive sleeve 222. The length of the conical portion of the shear levelers 232 and 252 is determined to provide sufficient area for adhesive 228 to transmit the anticipated force without exceeding its shear stress capability. For example, if adhesive 228 is capable of reliably transmitting 20 newtons per square millimeter in shear stress and the maximum anticipated torque results in a shear stress of 10000 newtons then the length of the conical portion would be determined to provide 500 square millimeters of adhesive attachment.

Ideally, the outer surfaces 236 and 256 of shear levelers 232 and 252 respectively would be shaped to maintain exactly constant shear stress in adhesive 228 in the regions between beginnings 246 and 266 of flared ends 248 and 268 and circumferential grooves 234 and 254 respectively. However, for applications where such as a ten to twenty percent variation in adhesive shear stress is acceptable, outer surfaces 236 and 256 may be exactly conical for simplicity of manufacture. If it is desired that the outer surfaces 236 and 256 be formed for exactly constant shear stress in adhesive 228 then the shape can be calculated directly by those adept in the art of stress analysis. A method for obtaining approximately constant shear stress in adhesive 228 is to iterate the shape of surfaces 236 and 256 by trial and error using any of the finite element computer codes able to calculate the stress in adhesive 228.

The flared ends 248 and 268 are shaped to provide adhesive thicknesses that increase with the squares of the distances from the positions 246 and 266 where the flares begin. It should be noted that the thickness of adhesive 228 is approximately zero except at flared ends 248 and 268. The illustrated thickness is only for the purpose of illustrating the presence of adhesive 228. The rate of flare of flared ends 248 and 268 is dependent on the torsional stiffness of flared ends 248 and 268 and the shear modulus of the selected adhesive 228. The rate of flare is determined so that the shear stress in adhesive 228 at flared ends 248 and 268 is the same or less than the shear stress in adhesive 228 at the conical portions of shear levelers 232 and 252. For one or both of the following two reasons it may be necessary for the shear stress in adhesive 228 to be two or three times less at flared ends 248 and 268 than at the conical portions of shear levelers 232 and 252. The first reason is that filling the space at the flared ends 248 and 268 requires an adhesive capable of filling large voids and such an adhesive may have lower shear strength than the adhesive used elsewhere. The second reason is that greater strength is often achieved where adhesive attachment is accompanied by an interference fit. If the designer provides an interference fit where the thicknesses 242 and 262 of adhesive 228 are constant the design may provide for greater shear stress in adhesive 228 at the regions of interference fit than at flared ends 248 and 268. It may be advantageous to pressurize adhesive 228 at flared ends 248 and 268 during curing to cause flared ends 248 and 268 to be slightly stretched so they do not expand under thermal cycling and place adhesive 128 under radial tension. A moderate pressure such as 3 mpa (450 psi) is likely to be sufficient for expected values of thicknesses 242 and 262. The final design should be analyzed with a finite element computer code to insure that excessive stresses do not occur over the expected operating temperatures.

Shaft 240 is made of a low magnetic permeability material such as aluminum or a 300 series stainless steel. Magnetostrictive sleeve 222 may be made of any of the materials identified hereinabove with reference to FIGS. 1 and 2 as suitable for magnetostrictive sleeve 22 and the required anisotropy may be imparted by any of the processes for imparting anisotropy described hereinabove with reference to FIGS. 1 and 2. For maximum reliability of adhesive 228 shear levelers 232 and 252 should be made of material having approximately the same coefficient of thermal expansion as shaft 240 and welded to magnetostrictive sleeve 22. If magnetostrictive sleeve 222 is made of a material having a substantially different thermal expansion coefficient than the material of shaft 240 then changes of temperature cause axial stress in adhesive 228 and the designer must assure that this stress does not overly stress adhesive 228. If this cannot be achieved then the designs illustrated in FIGS. 1 through 3 may be preferred because the collars 44 and 64 or 144 and 164 can flex to accommodate some of the axial strain.

Magnetostriction sensor 70 may be the same as illustrated in FIGS. 1 and 2 and fully described hereinabove with reference to FIGS. 1 and 2. In the design wherein magnetostrictive sleeve 222 and shear levelers 232 and 252 are made of the same material and magnetostrictive sleeve 222 responds to twisting by producing magnetic poles the optimum location for yokes 72 and 74 may be farther apart than illustrated in FIGS. 4 and 5. The optimum locations for yokes 72 and 74 for a particular design may be determined by experiment by adjusting the locations until the maximum value of the magnetic field is obtained. Adhesive 228 may be the same material as adhesive 28 which was fully described hereinabove in the description of the invention with reference to FIGS. 1 and 2.

The operation of the torque sensor 210 of the invention will now be described with reference to FIGS. 4 and 5.

When a torque is applied to shaft 240 it twists slightly. Between the ends of torque transducer 220 the torsional stiffness of torque transducer 220 and the torsional stiffness of shaft 240 add to create a total torsional stiffness. Proceeding from left to right in FIGS. 4 and 5 the total torsional stiffness increases between the rim of flared end 248 and circumferential groove 234 from the torsional stiffness of shaft 240 alone to the sum of the torsional stiffness of shaft 240 and the torsional stiffness of magnetostrictive sleeve 222. Adhesive 228 is uniformly stressed per unit of area to transfer a constant amount of torque per unit of axial distance from shaft 240 to shear leveler 232 of torque transducer 220. The torque transferred by adhesive 228 accumulates to cause a linearly increasing torque in shear leveler 232, first in flared end 248 and then in increasing thickness 242.

The elements to the right of magnetostrictive sleeve 222 are the mirror image of the elements to the left of magnetostrictive sleeve 222 which enables their operation to be described similarly by proceeding from right to left. Proceeding from right to left in FIGS. 3 and 4 the total torsional stiffness increases between the rim of flared end 268 and circumferential groove 254 from the torsional stiffness of shaft 240 alone to the sum of the torsional stiffness of shaft 240 and the torsional stiffness of magnetostrictive sleeve 222. Adhesive 228 is uniformly stressed per unit of area to transfer a constant amount of torque per unit of axial distance from shaft 240 to shear leveler 252 of torque transducer 220. The torque transferred by adhesive 228 accumulates to cause a linearly increasing (going from right to left) torque in shear leveler 252, first in flared end 268 and then in the increasing thickness 262.

At flared ends 248 and 268 the shear stress in adhesive 228 is constant because the varying thickness of adhesive 228 and the torsional stiffness of flared ends 248 and 268 combine to provide constant shear stress.

Between beginning 246 of flared end 248 and circumferential groove 234 the shear stress in adhesive 228 is constant because the torsional stiffness of shear leveler 232 increases with axial distance at a rate that provides constant shear stress.

Between circumferential groove 254 and beginning 266 of flared end 268 the shear stress in adhesive 228 is constant because the torsional stiffness of shear leveler 252 decreases axially at a rate that provides constant shear stress.

Minimizing thicknesses 242 and 262 at flared ends 248 and 268 respectively minimizes the energy that must be accommodated by adhesive 228 at flared ends 248 and 268 respectively which reduces the amount of adhesive required and enables a thinner and therefore more structurally sound adhesive bond.

Between circumferential grooves 234 and 254 the torsional stiffness is constant and the applied torque is shared between shaft 240 and magnetostrictive sleeve 222 and both twist equally so that there is no torsional stress in adhesive 228 between circumferential grooves 234 and 254.

In the preferred design wherein magnetostrictive sleeve 222 is magnetized circumferentially, applying torque about its axis of rotational symmetry causes it to produce magnetic poles on its axis thus causing it to resemble a bar magnet. The strength of the poles is proportional to the amount of torsional strain which is proportional to the applied torque. The magnetic poles cause magnetic flux to enter yokes 72 and 74 at surfaces 72' and 74' and pass through magnetic flux concentrators 76 and 78 and semiconductor magnetic field sensor 79. The flux through semiconductor magnetic field sensor 79 causes it to produce an electric signal proportional to the field through itself and, therefore, proportional to the applied torque. Other sensors responsive to torsional stress in a sleeve may be substituted for magnetostriction sensor 70.

Figure 6:
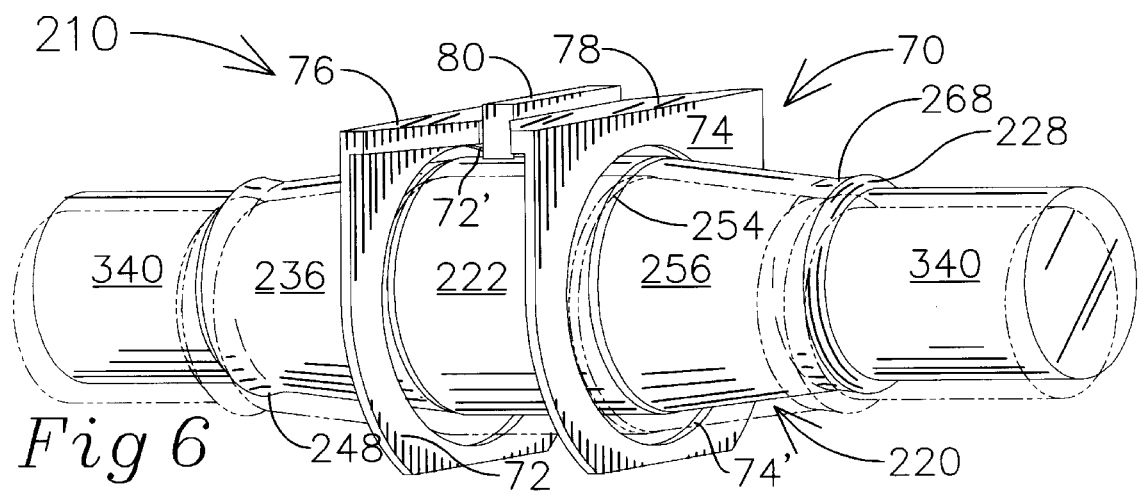
FIG. 6 shows a perspective view of an embodiment of the torque sensor of the invention illustrating the effect of a slightly bent shaft.

Proceeding now with reference to FIG. 6, the torque traducer 210 is the same as illustrated in FIGS. 4 and 5. Shaft 240 of FIGS. 4 and 5 has been replaced by shaft 340 which is the same as shaft 240 except that it is slightly bent (i.e. imperfect). In operation of the torque sensor 210 as the shaft 340 rotates the torque transducer 220 moves in an orbit inside the cylindrical openings 72' and 74' in yokes 72 and 74 respectively, By positioning magnetostriction sensor 70 so the axis of the orbital motion coincides with a line through the centers of the cylindrical openings 72' and 74' in yokes 72 and 74, as illustrated in FIG. 6, the response of torque sensor 210 is made independent of the rotation angle of shaft 340.

Referring particularly to FIG. 6, magnetostriction sensor 70 has been positioned so that the axis about which torque transducer 220 orbits coincides with a line passing through the centers of the cylindrical openings 72' and 74' in yokes 72 and 74. This is illustrated by showing torque transducer 220 on shaft 340 with solid lines in a first position and showing torque transducer 220 on shaft 340 with phantom lines in a second position 180 degrees in its orbit from the first position. In both of the two illustrated positions the distances from the magnetostrictive sleeve 222 to the nearest points on cylindrical openings 72' and 74' are the same.

In fact, for any angular position of torque transducer 220 the distances from the magnetostrictive sleeve 222 to cylindrical openings 72' and 74' at the points of closest proximity are the same. Further, the magnetic reluctance of each of the gaps between magnetostrictive sleeve 222 and cylindrical openings 72' and 74' is independent of the angle of rotation because the gap is always exactly the same except for its angular orientation. In other words, the reluctances of the magnetic paths between the magnetostrictive sleeve 222 and the yokes 72 and 74 are constant and independent of the angular position of transducer 220 and shaft 340.

Further, the total reluctance of the magnetic circuit conducting the flux generated by magnetostrictive sleeve 222 is substantially independent of the angular position of transducer 220 and shaft 340. This results because the only variable in the factors determining the reluctance is the path the flux takes through the yokes 72 and 74. For example, in FIG. 6 when transducer 220 and shaft 340 are in the position illustrated with solid lines most of the flux enters the yokes near the junctures with magnetic flux concentrators 76 and 78. In an alternate case, when transducer 220 and shaft 340 are in the position illustrated with phantom lines most of the flux enters the yokes far from the junctures with magnetic flux concentrators 76 and 78. In the alternate case the magnetic path is clearly much longer because the flux must pass around the yokes 72 and 74 which the flux is not required to do in the case illustrated with solid lines. However, the reluctance of the part of the magnet circuit comprising the air gap between magnetostrictive sleeve 222 and cylindrical openings 72' and 74' of yokes 72 and 74 is much greater than reluctance of the part of the magnetic circuit comprising the yokes 72 and 74 so the reluctance of the path within the yokes 72 and 74 only minimally affects the total reluctance.

Summarizing the preceding description of the invention with reference to FIG. 6, by locating the magnetostriction sensor 70 so that the reluctance of the air gap between the magnetostrictive sleeve 222 and the cylindrical openings 72' and 74' in yokes 72 and 74 respectively is independent of the angular position of the torque transducer 220 the response of torque sensor 210 to an applied torque is made substantially independent of the angular position of torque transducer 220.

Although the description of this invention has been given with reference to a particular embodiment, it is not to be construed in a limiting sense. Many variations and modifications will now occur to those skilled in the relevant arts. For a definition of the invention reference is made to the appended claims.

What is claimed is:

1. A sensor (10, 110, 210) responsive to torque applied to a shaft (40, 240, 340), said sensor comprising:
   a torsionally elastic member (22, 122, 222),
   a sensing element (70) responsive to torsional strain in said torsionally elastic member,
   a shear leveler (32, 132, 232) affixed to said torsionally elastic member for rotation therewith, and
   adhesive (28, 128, 228) bonding said shaft to said shear leveler over an area of adhesive bond for transmitting torque between said shaft and said shear leveler by shear stress, and wherein
said shear leveler is shaped to level said shear stress over said area of adhesive bond.

2. The invention as defined by claim 1 and including:
a second shear leveler (52, 152, 252) affixed to said torsionally elastic member for rotation therewith,
second adhesive (28', 128', 228) bonding said shaft to said second shear leveler over a second area of adhesive bond for transmitting torque between said shaft and said second shear leveler by second shear stress, and wherein
said second shear leveler is shaped to level said second shear stress over said second area of adhesive bond.

3. The invention as defined by claim 1 including a multiplicity of washers (84, 86 and 94), and wherein:
said torsionally elastic member has an axis of rotational symmetry and an inside surface,
each said washer has a washer axis,
each said washer engages said inside surface, and
each said washer axis is in alignment with said axis of rotational symmetry.

4. The invention as defined by claim 3 wherein a said washer has an outer circumference and two parallel surfaces defining a thickness, and
said outer circumference of said washer is crowned such that said washer has its greatest diameter in the plane equidistant from said two parallel surfaces.

5. The invention as defined by claim 3 wherein:
each said washer has an outer circumference, and
there is an interference fit between a said outer circumference of a said washer and said inside surface.

6. A sensor (10, 110, 210) responsive to torque applied to a shaft (40, 240, 340) comprising:
a magnetostrictive member (22, 122, 222),
means (70) responsive to torsional strain in said magnetostrictive member,
a shear leveler (32, 132, 232) affixed to said magnetostrictive member for rotation therewith, and
adhesive (28, 128, 228) bonding said shaft to said shear leveler over an area where said shaft and said shear leveler are in close proximity for transmitting torque between said shaft and said shear leveler by shear stress, and wherein
said shear leveler is shaped to cause said shear stress to be approximately constant over said area.

7. The invention as defined by claim 6 and including:
a second shear leveler (52, 152, 252) affixed to said magnetostrictive member for rotation therewith, and
second adhesive (28', 128', 228) bonding said shaft to said second shear leveler over a second area where said shaft and said second shear leveler are in close proximity for transmitting torque between said shaft and said second shear leveler by second shear stress, and wherein
said second shear leveler is shaped to cause said second shear stress to be approximately constant over said second area.

8. The invention as defined by claim 6 and wherein:
said magnetostrictive member has an axis of rotational symmetry and is permanently magnetized in the circumferential direction about said axis, and
said means responsive to torsional strain in said magnetostrictive member comprises a magnetic field sensor (79).

9. The invention as defined by claim 6 wherein:
said shaft has an axis of rotational symmetry, and
said magnetostrictive member is magnetized such that application of torque to said magnetostrictive member about said axis of rotational symmetry produces magnetic poles on said axis.

10. The invention as defined by claim 6 wherein:
said shaft has an axis of rotational symmetry, and cross sections of said shear leveler taken at said area and perpendicular to said axis have cross sectional areas that vary approximately linearly with distance along said axis.

11. The invention as defined by claim 6 wherein:
said shear leveler comprises an inside surface (38, 138, 238) mating with said shaft and an approximately conical outer surface (36, 136, 236).

12. The invention as defined by claim 6 wherein:
said shaft has an axis of rotational symmetry, and
said shear leveler has a thickness (42, 142, 242) that varies approximately linearly with distance parallel to said axis.

13. Means for transmitting torque between a shaft (40, 240, 340) and a rotatable element (22, 122, 222) comprising:
a shear leveler (32, 132, 232) affixed to said rotatable element for rotation therewith, and
adhesive (28, 128, 228), and wherein:
said shear leveler comprises a surface (38, 138, 238) mating to a surface of said shaft at an area,
said adhesive adheres to said shaft and to said shear leveler over said area for transmitting torque therebetween by shear stress, and wherein
said shear leveler is shaped to cause said shear stress to be approximately constant throughout said area.

14. The invention as defined by claim 13 and comprising:
a second shear leveler (52, 152, 252) affixed to said rotatable element for rotation therewith, and
a second adhesive (28', 128', 228), and wherein
said second shear leveler comprises a surface (58, 158, 238) mating to a surface of said shaft at a second area,
said second adhesive adheres to said shaft and to said second shear leveler over said second area for transmitting torque therebetween by a second shear stress, and wherein
said second shear leveler is shaped to cause said second shear stress to be approximately constant throughout said second area.

15. The invention as defined by claim 13 wherein:
said shaft has an axis of rotational symmetry,
said shear leveler has torsional stiffness about said axis at said area, and
said torsional stiffness varies approximately linearly with distance along said axis at said area.

16. The invention as defined by claim 15 including extended adhesive adhering to said shaft and to said shear leveler over an extended area that is outside said area, and wherein
said extended adhesive has an extended adhesive thickness that increases with a distance along said axis at said second area.

17. The invention as defined by claim 16 wherein:
said extended adhesive thickness increases as the square of a distance along said axis of rotational symmetry.

18. A method for maximizing the force that can be transmitted between a first member (40, 240, 340) and a second member (32, 132, 232) by shear stress in an adhesive (28, 128, 228), said method comprising:

adapting a first surface on said first member for adhesive bonding and adapting a second surface (38, 58, 138, 158, 238) on said second member for adhesive bonding, applying adhesive between said first surface and said second surface for transmitting shear force between said surfaces, and shaping said members for causing said shear stress to be approximately constant throughout said adhesive when said force is being transmitted.

19. The invention as defined by claim 18 wherein said method comprises:

shaping said first member to have an axis of rotational symmetry, whereby said force applies torque about said axis.

20. The invention as defined by claim 18 wherein said method comprises:

shaping said first member such that said adhesive transmits torque between said first member and said second member.

21. The invention as defined by claim 20 wherein said method comprises:

shaping one of said members to have a varying torsional stiffness.

22. A sensor (10, 110, 210) responsive to torque applied to a shaft (40, 240, 340) comprising a sensor (70) responsive to torsional strain in a torsionally elastic member (22, 122, 222) wherein said torsionally elastic member has an axis of rotational symmetry and an inside surface, and comprising a multiplicity of washers (84, 86 and 94) hag outside diameters engaging said inside surface, said washers being in axial alignment with said axis of rotational symmetry.

23. The invention as defined by claim 22 wherein each said washer has a two parallel surfaces defining a thickness, and the outer circumference of each of said washers is crowned such that each of said washers has its greatest diameter in the plane midway between said two parallel surfaces.

24. The invention as defined by claim 22 wherein each said washer has an outer diameter, and there is an interference fit between the outer diameters of said washers and said inside surface.

25. The invention as defined by claim 22 wherein said washers are spaced apart from each other, whereby said washers are free to rotate relative to each other without friction against each other when said sleeve twists.

\* \* \* \* \*